United States Patent [19]

Gondusky et al.

[11] Patent Number: 6,003,778

[45] Date of Patent: Dec. 21, 1999

[54] AUTOMOTIVE OIL LEVEL CONTROL APPARATUS

[75] Inventors: Joseph M. Gondusky, Warwick; Alfred J. White, North Providence, both of R.I.

[73] Assignee: Texas Instruments Incorporated, Dallas, Tex.

[21] Appl. No.: 09/134,966

[22] Filed: Aug. 17, 1998

[51] Int. Cl.$^6$ ................................................. G05D 23/08
[52] U.S. Cl. .................................. 236/93 R; 236/101 E; 428/616
[58] Field of Search ........................... 236/93 R, 101 E; 428/615, 616

[56] References Cited

U.S. PATENT DOCUMENTS

| | | | |
|---|---|---|---|
| 2,492,744 | 12/1949 | Gunn | 236/93 R |
| 3,228,605 | 1/1966 | Diermayer et al. | 236/93 R |
| 3,238,780 | 3/1966 | Doyle | 428/616 |
| 4,245,778 | 1/1981 | Diermayer | 236/93 R |
| 4,294,401 | 10/1981 | Diermayer et al. | 236/93 R |
| 4,384,671 | 5/1983 | Hayes | 236/93 R |
| 4,865,250 | 9/1989 | Zaveri et al. | 236/93 R |
| 4,921,165 | 5/1990 | Ty et al. | 236/93 R |
| 5,195,678 | 3/1993 | Giasson et al. | 236/93 R |
| 5,209,399 | 5/1993 | Gondusky et al. | 236/93 R |

*Primary Examiner*—William E. Tapolcal
*Attorney, Agent, or Firm*—Russell E. Baumann; Richard L. Donaldson

[57] ABSTRACT

An oil level control valve (10) has a molded base (12) having an oil receiving aperture (12d) formed through a bottom wall (12e) with a circumscribing generally rectangular cover plate seat in which a cover plate (14) is removably received. A thermostatic element (16) in the form of a generally rectangular sheet is fastened to posts (12f) extending upwardly from sidewalls of the base by means of peg portions (12g, 12h) received through holes in the sheet and heat staked to the posts. The thermostatic element allows the cover plate to move away from the seat for optimum oil flow at low temperature conditions and restricts the valve opening as temperature of the oil increases to accommodate an increase in oil volume due to expansion in order to maintain the fluid level in the main sump of a transmission housing by allowing an increase in the fluid level of an auxiliary sump in accordance with target values for different flow rates. A second embodiment (10') shows the addition of a snap-on bracket (20) for convenient mounting of the control along with an associated installation tab (12k) for handling purposes.

9 Claims, 6 Drawing Sheets

AUTOMOTIVE OIL LEVEL CONTROL APPARATUS

FIELD OF THE INVENTION

This invention relates generally to an automotive transmission fluid control and more particularly to a temperature responsive valve for use with a transmission oil reservoir.

BACKGROUND OF THE INVENTION

Hydraulic pressure systems, as used in motor vehicles, require a supply of transmission fluid. Maintaining an adequate oil level in the transmission oil pan at all operating temperatures is essential for effective transmission performance. The oil pan serves as a sump to provide the necessary supply, however, in front wheel drive vehicles the transmission oil pan is too shallow to hold an appropriate quantity. The problem is exacerbated by the fact that the volume of the oil used expands at elevated temperatures. The height of the level of the sump needs to be limited in order to avoid having moving elements of the transmission from being immersed causing the creation of foam which would result in loss of torque. On the other hand, if the sump level falls too low, there would be a loss of pump inlet supply which would result in damage. The problem has been dealt with by employing an auxiliary sump at the side of the transmission case cover. The fluid level in the auxiliary sump is controlled by a thermostatic element which controls the amount of force placed on a valve element controlling the amount of fluid flow from the auxiliary sump to the main sump in dependence upon the temperature of the oil in the auxiliary sump. As the temperature of the oil increases, the force placed on the valve element by the thermostatic element increases to produce an increase in the height of the oil level in the auxiliary sump in a controlled manner ideally maintaining the height of the oil in the main sump at a constant level.

A control valve of the type described is shown in U.S. Pat. No. 5,195,678, assigned to the assignee of the present invention, the subject matter of which is incorporated herein by this reference. A control made in accordance with an embodiment of that patent is shown in FIG. 10 and comprises a generally U-shaped member 120 comprising a strip 126 of thermostatic material having a mounting strip 122 of monometal at a first end mounted on a first member 104 of a pair 104, 106 of thermoplastic post members extending upwardly from a base 102. The integrally attached thermostatic strip has a second opposite end 134 biased against a metal cover plate 110 covering a fluid aperture 108, the cover plate being slidably movable along the post members toward and away from the fluid aperture. A first fluid path is provided at temperatures below a selected level in which the cover plate hinges about a location on the second member 106 of the pair of post members and a second fluid path is provided at temperatures above the selected level with the effective hinge location shifting to a location on the base adjacent the first post member 104. A spring 136 is disposed on the second of the pair of post members which places a bias on the cover plate so that a force relatively independent of temperature is placed on the cover plate at one end while another force dependent on temperature is placed on the cover plate at a location on the other side of center line between opposite ends of the plate with the result that the effective location of the hinge point switches between two different locations to provide a non-linear curve of head height (i.e., force) versus temperature.

The control valve needs to respond to different flow rates, for example, from a low of ¼ gpm at idle to 1 gpm at full throttle. With reference to FIG. 10, a target, or model curve of fluid height in mm in the auxiliary sump versus temperature for a particular automotive transmission is shown in FIG. 8 with curve a representing the ¼ gpm model and curve b representing the 1 gpm model. The model curves, showing an increase height of the auxiliary sump with increasing temperature, result in an essentially constant oil level in the main sump in the selected transmission. A control valve made in accordance with the FIG. 10 embodiment of the above referenced patent resulted in actual height shown by curve c for ¼ gpm and d for 1 gpm. Although the control valve resulted in tracking of the model curves, it would be desirable to decrease the difference or delta between the model and actual curves, particularly in the ¼ gpm low and middle temperature operating range. It would also be desirable to decrease the differences between the low flow rate and high flow rate curves.

Additionally, it would be desirable to provide a control valve which is less expensive to manufacture and assemble and one which has improved longevity. For example, in the FIG. 10 embodiment, each device must be separately calibrated by pushing the temperature responsive member onto its respective post to a selected location and the coil spring member onto its respective post to a selected location as determined by a defined force level. Although further adjustments can be made in pushing the members further down their respective posts, care must be taken not to exceed the calibrated positions to avoid having an unusable device. Another limitation is that over time the plastic posts tend to yield or bend causing the calibration to drift. Still another limitation is that the temperature responsive member is relatively complex using a monometal portion welded to a thermostat metal strip formed into a somewhat precise U-shape.

From an ideal standpoint, the target curves could most easily be achieved by using an elongated, narrow thermostat blade having a low mechanical spring rate; however, in certain transmission housings there is insufficient space for this approach. With transmission housings to which the present invention is addressed, the available footprint is more square shaped than elongated and on the order of only one to two inches in length and width.

SUMMARY OF THE INVENTION

It is therefore an object of the present invention to provide a valve control which overcomes the limitations of the above noted prior art. Another object of the invention is to provide a liquid level control valve which is simple in design and has fewer component parts than comparable prior art valves and one which is more easily assembled and has enhanced longevity. Yet another object of the present invention is the provision of a liquid level control valve which has improved performance in tracking model curves of auxiliary sump height versus temperature for different flow rates.

Other objects and features of the invention will become more readily understood from the following detailed description and drawings in which like reference numerals designate like parts throughout the figures thereof.

Briefly, in accordance with a first embodiment of the invention, a temperature responsive, thermostatic metal sheet element having opposed first and second ends has a pair of cantilever blades struck from a location adjacent the first end and extending toward but short of the second end and an interdigitated cantilever blade struck from a location adjacent the second end and extending toward but short of the first end. The blades are permanently bent to extend away from the plane in which the sheet element lies in a given direction to provide a formed height extending from the plane to the distal end portions of the blades. The element is received on and attached to posts extending from a base. A fluid aperture is formed through the bottom wall of the base and a cover plate is loosely received over the aperture within the perimeter formed by the posts which serve as guides for the plate. The base is received in an opening formed in a sidewall of a transmission housing. The base has an outwardly extending flange with a suitable gasket seated thereon to provide a fluid tight seal with the housing sidewall. The flange is suitably attached, in one preferred embodiment, by means of a clamp or the like (not shown) or in another preferred embodiment, by means of a snap-on bracket received on the posts of the base over the temperature responsive element.

The valve is oriented so that the seat of the cover plate is generally slightly inclined from a vertical position so that the base plate tends to pivot with the pivot located at the bottom of the seat. The interdigitated center blade preferably extends upwardly. At higher temperatures, e.g., greater than 150° F., the outer blades apply a force through a relatively small moment arm while the inner blade applies a force through a relatively large moment arm. At lower temperatures, e.g., lower than 150° F., the outer blades, aligned with the bottom portion of the cover plate, dominate and as the temperature increases the interdigitated blade, aligned with the upper portion of the arm plate, becomes dominant. At very low temperatures, e.g., minus 40° F., the outer blades can move away from the cover plate concomitantly allowing the entire cover plate to move away from the aperture to optimize flow and maximize the oil supply in the main sump. As the temperature of the oil increases and its volume expands the outer blades move into engagement with the plate and start applying a force tending to push the bottom of the cover plate against the cover plate seat. The center blade, acting through a long moment arm, eventually dominates causing the plate to pivot, decreasing the valve opening, thereby restricting flow allowing the auxiliary sump level to build-up and the main sump level to remain essentially constant.

BRIEF DESCRIPTION OF THE DRAWINGS

FIG. 4 is a diagrammatic view of the FIGS. 1–3 embodiment, as assembled while

DETAILED DESCRIPTION OF THE PREFERRED EMBODIMENTS

Figure 1:
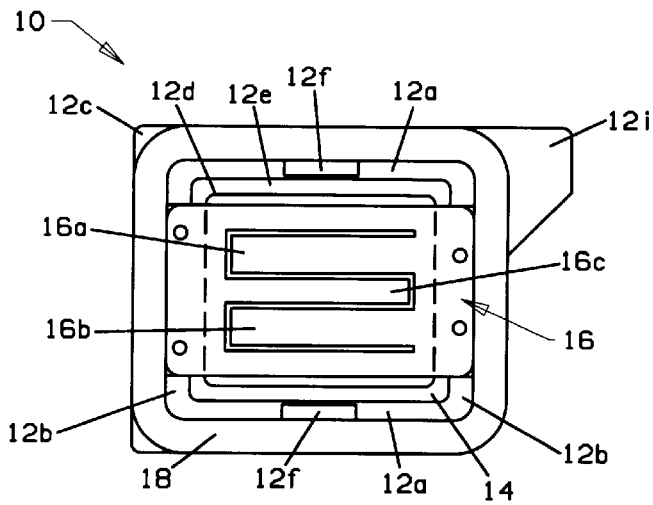
FIGS. 1–3 are top plan, front and side elevation views respectively of a fluid level control valve made in accordance with a first preferred embodiment of the invention.
Figure 2:
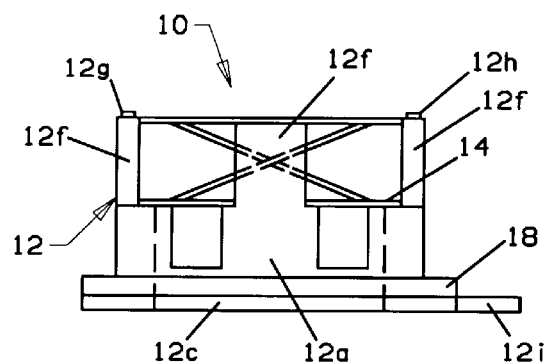
Figure 3:
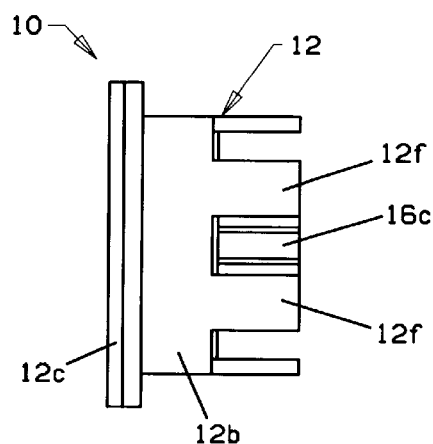

With reference to FIGS. 1–3, an oil level control valve 10 made in accordance with the invention is shown comprising a base member 12 formed of suitable material, preferably a moldable material such as nylon. The base member has opposed sidewalls 12a, 12a, 12b, 12b extending upwardly from a bottom wall 12e having a circumscribing, outwardly extending flange 12c. A generally rectangular aperture 12d is formed through the bottom wall adjacent to the sidewalls leaving a ledge which serves as a seat for a valve closure plate 14. A pair of posts 12f extend upwardly from each sidewall 12b and are preferably provided with an upstanding peg portion, 12g on one pair and 12h on the opposed pair. Peg portions 12g, 12h are identical except the spacing between the peg portions of one pair is preferably chosen to be different from that of the other pair to ensure proper orientation of a thermostatic element 16 to be mounted thereon. Another pair of posts may be provided and are shown extending upwardly from walls 12a to form, with the posts on walls 12b, a protective cage for the thermostatic element. Thermostatic element 16 is generally rectangular formed from a selected thermostatic metal sheet having first and second, spaced cantilever outer blades 16a, 16b extending from a location adjacent a first end toward, but short of, the opposite second end with an interposed, center interdigitated cantilever inner blade 16c extending from a location adjacent the second end toward, but short of, the first end. Mounting holes are provided at either end to accommodate the peg portions of the posts. Blades 16a, 16b, 16c are permanently bent so that they extend downwardly as seen in FIG. 2 out of the plane in which the thermostatic sheet element as a whole lies to provide a selected formed height. Thus the length, width and formed height of each of the blades are independently variable, as well as the thickness and material of the thermostatic element, to provide selected forces which will be exerted by the blades in dependence upon temperature so that the valve can be adapted to various systems having auxiliary sumps of different cross-sectional areas and force requirements.

In assembling the control valve, cover plate 14, which is a generally rectangular metal sheet or plate having a size selected to loosely fit within the cage formed by posts 12f which serve as guide elements for the cover plate as it moves toward and away from its seat, is placed on ledge seat 12e. It will be noted that cover plate 14 can be placed with one end portion facing in either of two opposite directions, to the right or to the left, as seen in FIGS. 1, 2. In the particular embodiment described, the opening available in the transmission casing sidewall is limited in size with the length of the opening, in the direction extending between the end walls 12b of the control valve base 12, being slightly longer than the width, the direction extending between the front and back walls 12a. Cover plate 14 is correspondingly configured and can be inserted with either end facing a given end sidewall 12b of the control valve base. Thermostatic element 16 is then placed on posts 12f with peg portions 12g, 12h received through respective openings in the thermostatic blade and the peg portions are heat staked over the thermostatic blade to be securely attached thereto. A suitable gasket 18 is placed on flange 12c and the valve is inserted into the opening in the transmission housing wall (not shown) and attached to the wall in a suitable manner as by clamping to the sidewall utilizing the lower surface of flange 12c as seen in FIGS. 1, 2. Finger portion 12i can be used in the clamping procedure as well as providing a means for orienting the control valve so that blades 16a, 16b and 16c are in their proper orientation, to be discussed below.

Control valve 10, placed in the sidewall of a transmission housing, is oriented so that center blade 16c extends generally upwardly while outer blades 16a, 16b extend generally downwardly. Preferably, the plane in which the thermostatic element 16 lies, as installed, is slightly off vertical at an angle alpha, for example on the order of 13 degrees, as shown in FIGS. 4a–4e. At room temperature the distal ends of the blades are spaced from cover plate 14 with the distal end portions of blades 16a and 16b aligned generally with the bottom portion of cover plate 14 and the distal end portion of blade 16c aligned generally with the upper portion of cover plate 14. Due to the angular orientation of housing 12, cover plate 14 tends to pivot about its bottom edge in a valve opening direction.

Figure 4:
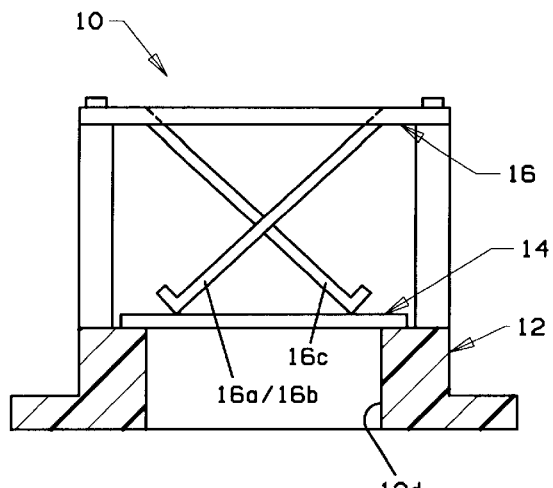

Valve 10, as assembled, is shown diagrammatically in FIG. 4. As stated above, valve 10, mounted in a selected transmission, is preferably oriented so that the plane in which valve seat 12e lies is tilted at a selected angle alpha from the vertical, for example, as shown at 13 degrees in FIGS. 4a–4e.

Figure 4A:
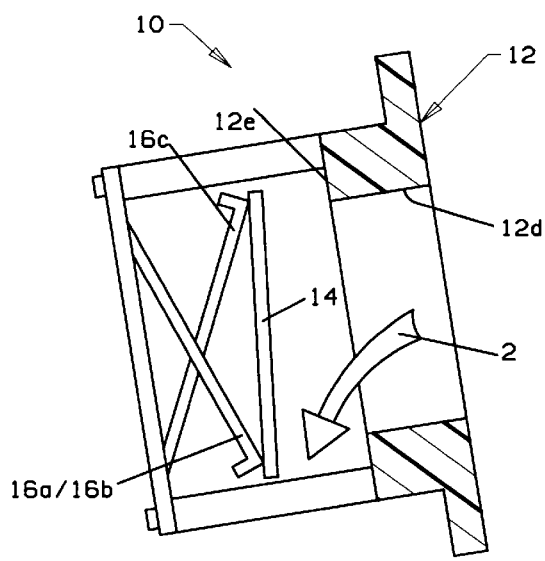
FIGS. 4a–4e are diagrammatic views showing the position of the cover plate at different flow and temperature conditions.

FIG. 4a illustrates an extreme cold flow condition, i.e., minus 40° F. It will be noted that blades 16a, 16b and 16c are all in a retracted position relative to valve seat 12e with the high viscosity fluid pressure denoted by arrow 2 causing cover plate 14 to move completely away from the valve seat against the low spring rate thermostatic blades.

Figure 4B:
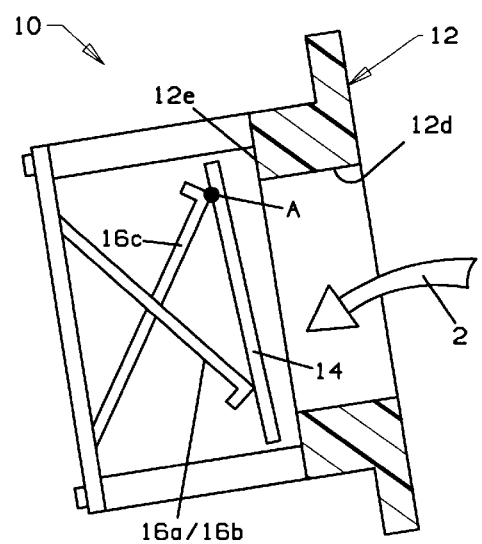

FIG. 4b illustrates the position of the cover plate which provides the desired rapid (high rate) closure for head build-up below 150° F. This is a result of blades 16a, 16b powerfully applying their force to close the lower portion of the valve cover plate edge through a long moment arm about pivot point A.

Figure 4C:
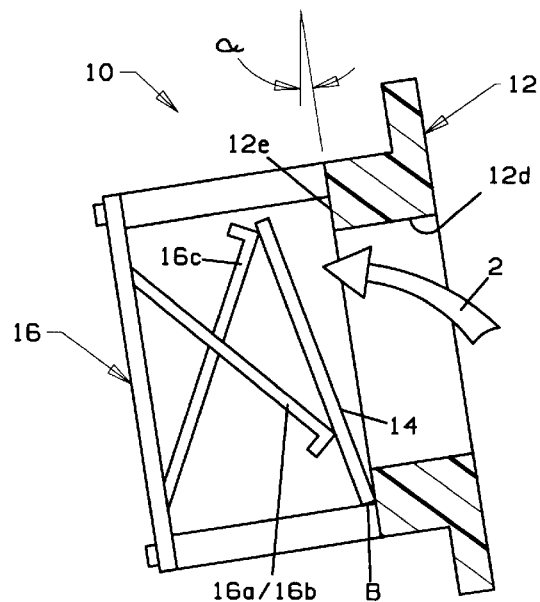

FIG. 4c illustrates the ideal transition point from a rapid closure rate to a slow closure rate at 150° F. This is a result of full closure of the lower cover plate edge and the transfer of the force fulcrum from pivot point A to pivot point B.

Figure 4D:
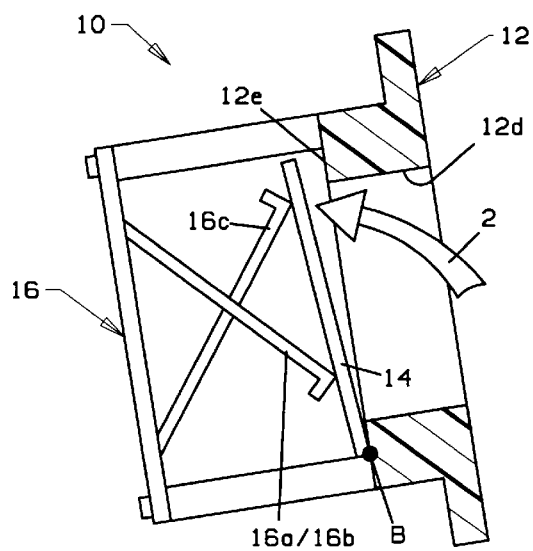

FIG. 4d illustrates the cover plate position which provides the desired slow (low rate) closure for head build-up above 150° F. This is a result of pivot point B providing a short-end moment for blades 16a, 16b and only the less powerful single blade 16c continues to exert force at the reduced rate (oz/° F.).

Figure 4E:
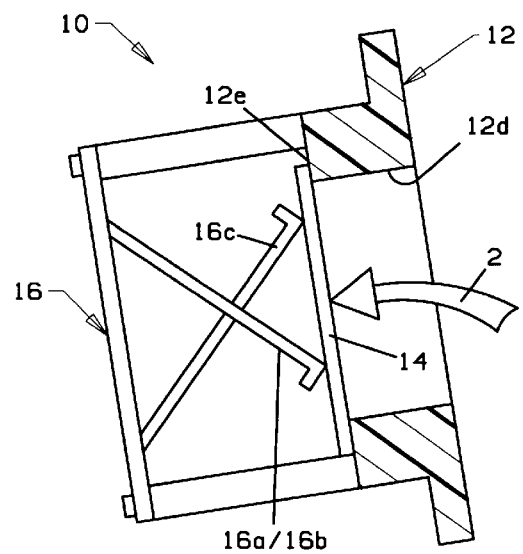

FIG. 4e illustrates an opposite extreme (at approximately plus 300° F.) position when the valve is nearly closed and flow is in a leakage mode only all around the four sides of the cover plate.

Figure 8:
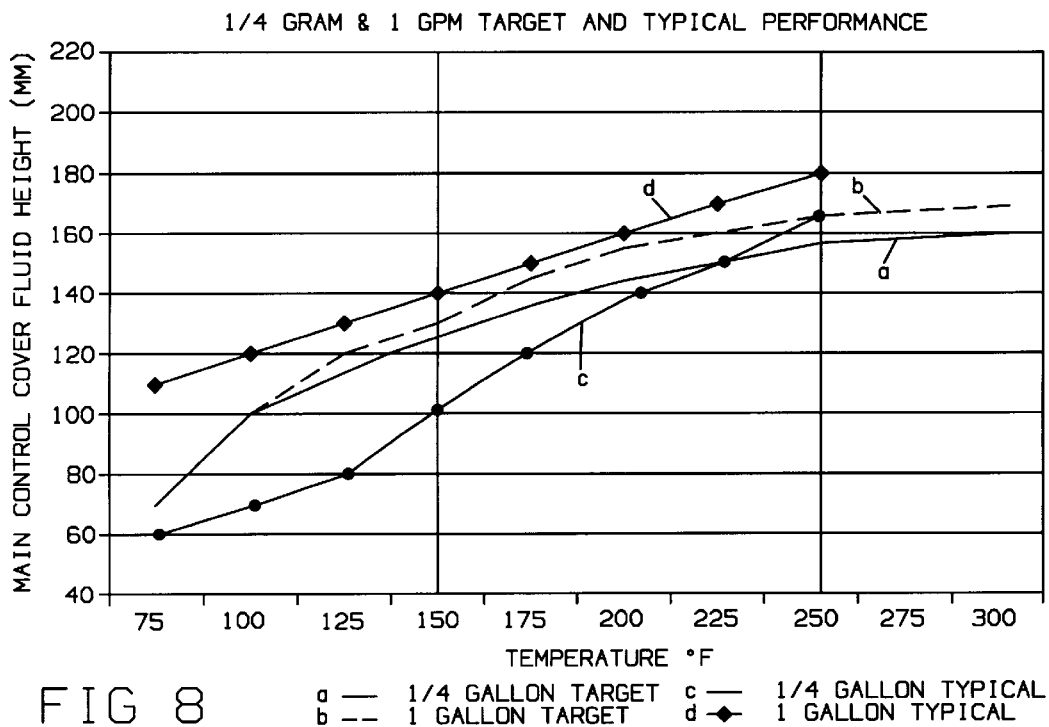
FIG. 8 is a graph showing auxiliary sump fluid height in millimeters versus temperature in degrees Fahrenheit for a control valve made in accordance with the prior art in a selected transmission housing.
Figure 9:
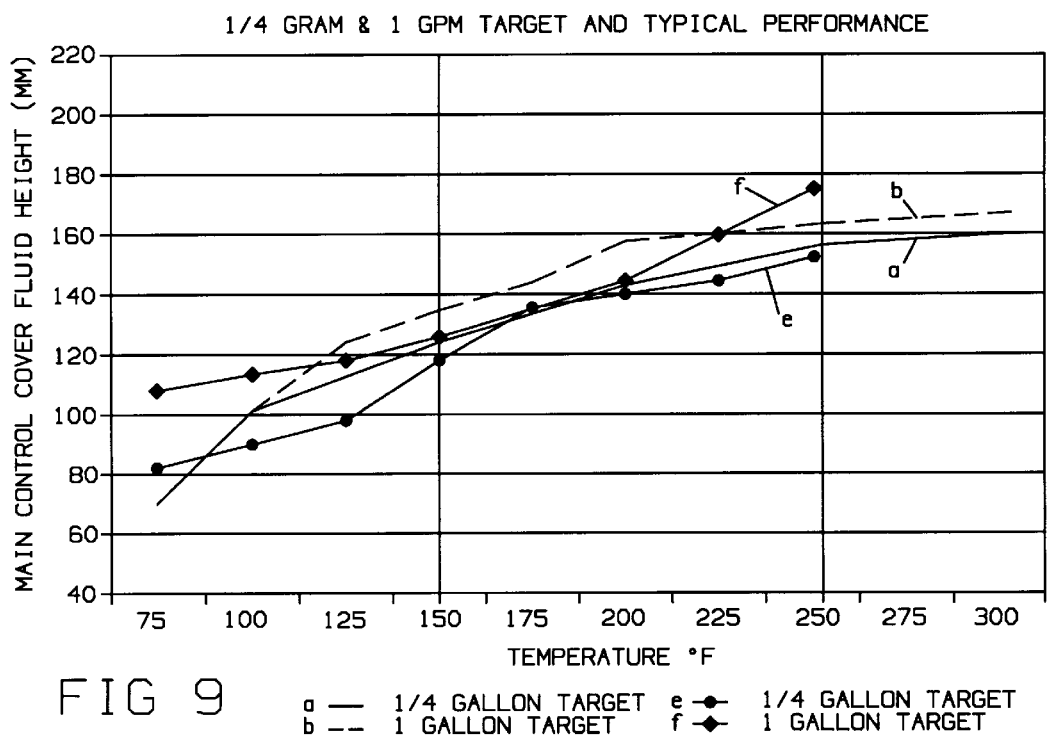
FIG. 9 is a graph similar to FIG. 8 for a control valve made in accordance with the invention in the same type of transmission housing.
Figure 10:
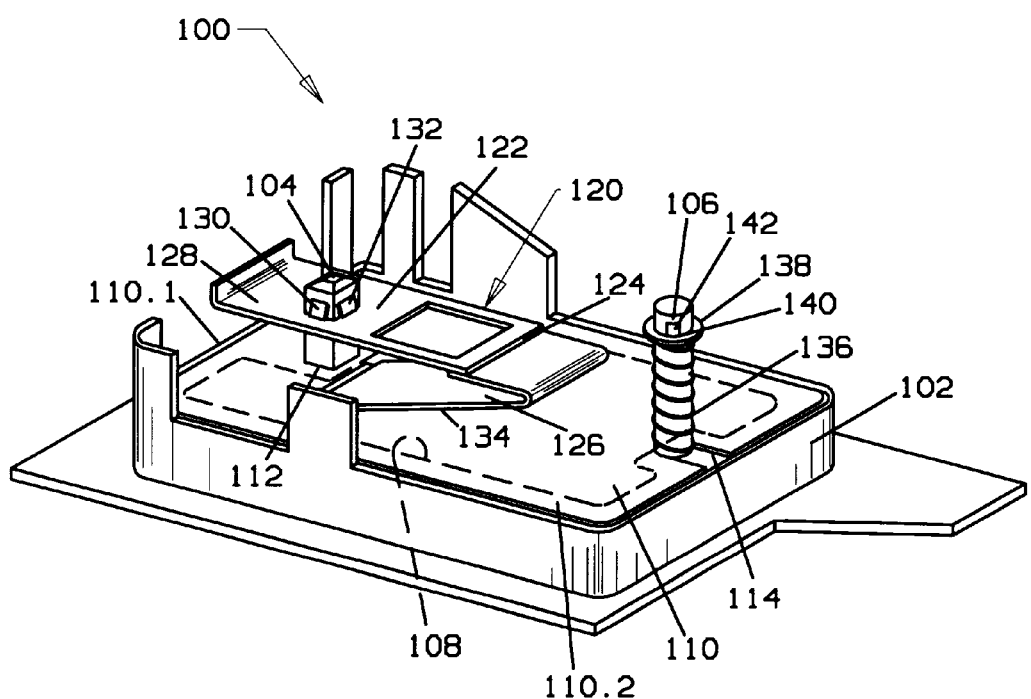
FIG. 10 is a perspective view of a prior art liquid level control valve.

As discussed above, the function of the control valve is to vary the force on the valve cover plate in a manner to maintain the oil level in the main sump relatively constant across a range of conditions in which the flow rate varies, for example, from ¼ gpm at idle speeds to a high of 1 gpm at full throttle and from a low temperature, such as, 75° F. to a high temperature, such as, 250° F. As the temperature of the oil increases it expands in volume so that the head in the auxiliary (side) sump is caused to increase by restricting the valve opening in dependence upon temperature. A target curve of auxiliary sump height depicted by line a (¼ gpm) and b (1 gpm) for a particular transmission which results in an essentially constant main sump liquid level is shown in FIG. 9, the same target curve shown in FIG. 8. Line e (¼ gpm) and line f (1 gpm) reflects the performance of a control valve made in accordance with the FIGS. 1–3 embodiment. It will be seen that the delta in sump height between curves e, f and target curves a, b respectively has been significantly decreased relative to the delta in sump height between curves c, d of the prior art valve control and target curves a, b, particularly at the mid-range operating temperatures, e.g., 150° F.

It will be seen that an improved control valve is provided by the instant invention which not only provides improved performance but is simpler in construction, lower in cost and one in which the set calibration will not tend to drift over time. The calibration of each of the devices can be conveniently verified during assembly by checking the 75° F. force exerted by the blades using a force probe aligned with the cover plate on the side thereof away from the thermostatic element.

Figure 5:
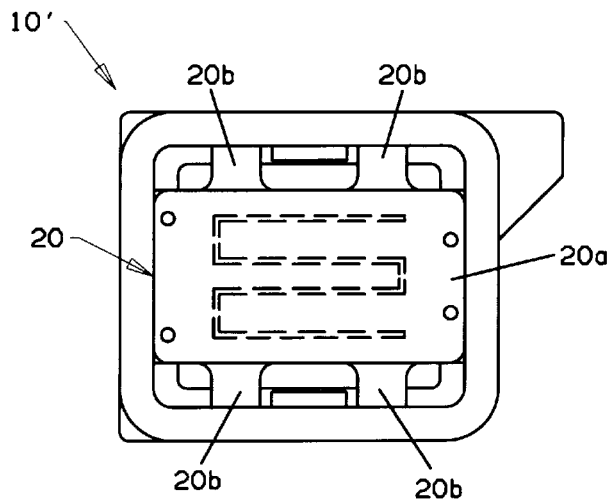
FIGS. 5–7 are the top plan, front and side elevational views respectively of a fluid level control valve member made in accordance with a second embodiment of the invention.
Figure 6:
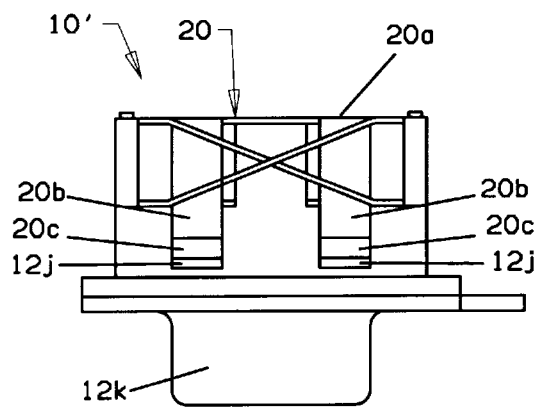
Figure 7:
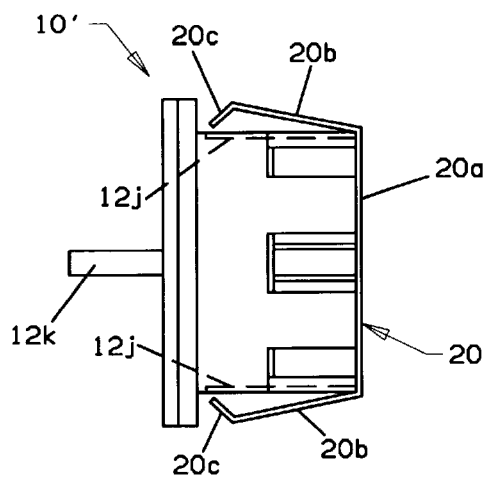

A modified embodiment is shown in FIGS. 5–7 which shows the FIGS. 1–3 structure along with the addition of a snap-on bracket 20. Bracket 20 formed of suitable spring material comprises a main base portion 20a preferably corresponding to the outer peripheral configuration of thermostat element 16 but formed with a pair of spring legs 20b. A pair of bores are provided at each end of main base portion 20a sized the same as the bores in the thermostatic element 16 and aligned therewith so that the bracket can be inserted onto peg portions 12h, 12g over thermostatic element 16 and both can be staked to posts 12f in the same operation. Legs 20b are formed so that they extend from each of the front and rear portions of the main body 20a toward flange 12c of base 12 flaring slightly outwardly away from sidewalls 12a, 12b and having an inwardly flaring tab portion 20c. Sidewalls 12a, 12b of base 12 are formed with vertically extending grooves 12j which are aligned with legs 20a and allow the legs to move inwardly to be in alignment with sidewalls 12a, 12b as the control valve is inserted into an opening in the transmission housing sidewall. Once inserted the spring legs move outwardly out of the grooves to securely hold the control body within the opening. In order to facilitate handling and inserting of the control valve a tab 12k is preferably added to body 12 to extend downwardly beyond flange 12c. The particular length of each of legs 20b and location of tab portion 20c is selected to accommodate the thickness of the sidewall of the transmission housing contiguous with the assigned location of the respective legs.

Although the invention has been described with respect to specific preferred embodiments thereof, many variations and modifications will become apparent to those skilled in the art. Further, it will be appreciated that the performance curves can be modified by independent adjustment of the length, width and formed height to provide a selected preload or an absence of preload of blade members 16a, 16b and 16c. It is the intent that the appended claims be interpreted as broadly as possible in view of the prior art to include all such variations and modifications.

What is claimed:

1. An oil level control valve comprising a base having a bottom wall and sidewalls extending therefrom to a distal end, an oil receiving aperture formed through the bottom wall with the bottom wall circumscribing the aperture forming a cover plate seat, a cover plate having two opposite end portions movably received on the cover plate seat covering the aperture, a thermostatic sheet element having a selected thickness and having first and second opposite ends, first and second spaced cantilever blades struck from the sheet extending from a location adjacent the first end toward the second end and a third interdigitated cantilever blade struck from the sheet extending from a location adjacent the second end toward the first end, the blades having a selected width and length and extending to a free distal end and being bent to extend a selected height away from a plane in which the ends of the thermostatic element lie, the thermostatic element being attached to the distal end of the sidewalls so that the blades extend toward the cover plate with the distal free end of the first and second blades aligned with an end portion of the cover plate and the distal free end of the third blade aligned with an opposite end portion of the cover plate, a flange extending outwardly from the base forming a gasket receiving seat and facilitating mounting of the control valve to a transmission housing having a control valve receiving opening in a housing wall; and a gasket disposed on the flange to provide a liquid seal when the control valve is mounted to a transmission housing wall.

2. An oil level valve according to claim 1 in which the base is formed of moldable plastic material.

3. An oil control valve according to claim 2 in which the sidewalls include a plurality of posts having peg portions and the thermostatic element is formed with peg receiving apertures, the thermostatic element being received on the posts with the peg portions extending through respective peg receiving apertures and the peg portions are deformed to extend laterally beyond the peg receiving apertures to affix the thermostatic element to the base.

4. An oil control valve according to claim 3 further comprising an attachment bracket having a base portion formed with peg receiving apertures and spring legs extending from opposed sides, the attachment bracket being received over the thermostatic element on the posts with the peg portions extending through the peg receiving apertures of the attachment bracket and the spring legs extending along the sidewalls of the base.

5. An oil level control valve according to claim 4 in which the sidewalls of the base are formed with spring leg receiving slots aligned with the respective spring legs to accommodate movement of the spring legs inwardly into the slots as the control valve is inserted into a control valve opening of a transmission sidewall.

6. An oil level control valve according to claim 4 further including a tab extending from the base in a direction generally parallel to the sidewalls in an opposite direction to facilitate handling of the control valve during installation.

7. An oil level control valve comprising a base, an oil receiving aperture formed through the base, a cover plate movably received on the base covering the aperture, a thermostatic sheet element having first and second opposite ends, at least one cantilever blade struck from the thermostatic sheet element extending from a location adjacent the first end to a distal free end adjacent to the second end, at least another cantilever blade struck from the thermostatic sheet element extending from a location adjacent the second end to a distal free end adjacent to the first end, all of the blades being bent to extend a selected height away from a plane in which the first and second ends lie; the thermostatic sheet element being attached to the base so that all of the blades extend toward the cover plate and, at least at selected temperatures, into force transmitting engagement with the cover plate.

8. An oil level control valve according to claim 7 in which the at least one cantilever blade comprises first and second spaced apart blades and the at least another cantilever blade comprises a third blade interdigitated between the first and second spaced apart blades.

9. An oil level control valve according to claim 8 in which the cover plate has two opposite end portions and the distal free end of the first and second blades are aligned with one end portion of the cover plate and the distal free end of the third blade is aligned with the other end portions of the cover plate.

\* \* \* \* \*